United States Patent
Brown et al.

(10) Patent No.: US 6,616,125 B2
(45) Date of Patent: Sep. 9, 2003

(54) CORROSION RESISTANT MAGNETIC ALLOY AN ARTICLE MADE THEREFROM AND A METHOD OF USING SAME

(75) Inventors: Robert S. Brown, Leesport, PA (US); Leslie L. Harner, Fleetwood, PA (US)

(73) Assignee: CRS Holdings, Inc., Wilmington, DE (US)

( * ) Notice: Subject to any disclaimer, the term of this patent is extended or adjusted under 35 U.S.C. 154(b) by 0 days.

(21) Appl. No.: 09/880,974

(22) Filed: Jun. 14, 2001

(65) Prior Publication Data

US 2003/0038271 A1 Feb. 27, 2003

(51) Int. Cl.[7] .............................................. F16K 31/00
(52) U.S. Cl. ......................................... 251/368; 251/65
(58) Field of Search .................................... 251/65, 368

(56) References Cited

U.S. PATENT DOCUMENTS

| 2,471,079 A | | 5/1949 | Post et al. | |
|---|---|---|---|---|
| 4,255,193 A | * | 3/1981 | Slesar et al. | 419/19 |
| 5,572,922 A | * | 11/1996 | Moon | 92/181 P |

FOREIGN PATENT DOCUMENTS

| EP | 0601854 | 6/1994 |
|---|---|---|
| EP | 0629771 | 12/1994 |
| JP | 2001011582 | 1/2001 |

OTHER PUBLICATIONS

Carpenter Alloy Data Sheet, "Chrome Core® 18–FM Solenoid Quality Stainless".
Carpenter Alloy Data Sheet, "Carpenter Stainless Type 430FR Solenoid Quality".
Carpenter Alloy Data Sheet, "Carpenter Stainless Type 430F Solenoid Quality".
Carpenter Alloy Data Sheet, "Chrome Core® 8 & 8F–M Alloys 12 & 12–FM Alloys".
Carpenter Alloy Data Sheet, "Carpenter Glass Sealing 27".

* cited by examiner

Primary Examiner—Edward K. Look
Assistant Examiner—John K Fristor, Jr.
(74) Attorney, Agent, or Firm—Dann, Dorfman, Herrell and Skillman, P.C.

(57) ABSTRACT

A corrosion resistant, soft magnetic, ferritic steel alloy, a useful article made therefrom, and a method of using the alloy are described. The alloy has the following composition in weight percent.

| C | 0.005–0.040 |
|---|---|
| Mn | 1.0 max. |
| Si | 1.0 max. |
| P | 0.050 max. |
| S | 0.020 max. |
| Cr | 27.0–30.0 |
| Ni | 0.35 max. |
| Mo | 0.35 max. |
| Cu | 0.35 max. |
| Co | 0.25 max. |
| N | 0.010–0.05 |

The balance is essentially iron and the usual impurities found in similar grades of ferritic stainless steels. In accordance with another aspect of this invention, there is disclosed a magnetic component for a magnetically actuated device such as a solenoid valve wherein the magnetic component is formed of the aforesaid alloy. In accordance with a further aspect of this invention, there is disclosed a solenoid valve that incorporates a movable magnetic core that is formed of the aforesaid alloy.

21 Claims, 1 Drawing Sheet

CORROSION RESISTANT MAGNETIC ALLOY AN ARTICLE MADE THEREFROM AND A METHOD OF USING SAME

FIELD OF THE INVENTION

This invention relates to corrosion resistant magnetic alloys, and in particular to such an alloy having a unique combination of corrosion resistance and magnetic properties and to the use of such an alloy in a magnetic component for a magnetically actuated device.

BACKGROUND OF THE INVENTION

Magnetically actuated devices, such as solenoid valves and relays, have been used in industrial and scientific systems for controlling the operations of those systems. In particular, solenoid valves are used to control the flow of fluids in chemical processes. Such devices include a magnetic coil and a moving magnetic core or plunger. In a typical arrangement, the coil surrounds the plunger such that when the coil is energized with electric current, a magnetic field is induced in the interior of the coil. The plunger is formed of a soft magnetic steel. A spring holds the plunger in a first position such that the device is either normally open or closed. When the coil is energized, the induced magnetic field causes the plunger to move to a second position to either close the device, if it is normally open, or open it, if it is normally closed. It is desirable that the material used to make the plunger have good magnetic properties, principally, a low coercive force and a high saturation induction.

The plunger is often in direct contact with the local environment and, in the case of the solenoid valve, with the fluid that is being controlled. For that reason, it is desirable that the plunger be formed of a material that has good resistance to corrosion because many such environments and fluids are corrosive and will corrode the plunger, which may cause the device to malfunction or the valve to leak or become inoperative.

Corrosion resistant, magnetic alloys are known that are suitable for use in components for solenoid valves. The weight percent compositions of two of the known alloys are set forth below.

|    | Alloy A      | Alloy B      |
| -- | ------------ | ------------ |
| C  | 0.065 max.   | 0.065 max.   |
| Mn | 0.80 max.    | 0.80 max.    |
| Si | 1.00–1.50    | 0.30–0.70    |
| P  | 0.03 max.    | 0.03 max.    |
| S  | 0.25–0.40    | 0.25–0.40    |
| Cr | 17.25–18.25  | 17.25–18.25  |
| Ni | 0.60 max.    | 0.60 max.    |
| Mo | 0.50 max.    | 0.50 max.    |

The balance of each of those alloys is iron and usual impurities.

Alloys A and B provide acceptable magnetic properties, particularly a high magnetic permeability, low coercive force, and low residual induction. These alloys also provide good corrosion resistance for many types of solenoid valves. Consequently, these alloys have been widely used in the solenoid valve market. However, a need has arisen for greater corrosion resistance than Alloys A and B are able to provide, coupled with magnetic properties that are at least as good as the magnetic properties of Alloys A and B. The demand for better corrosion resistance is also coupled with a need for a soft magnetic material that is metallurgically clean. This need has arisen particularly in the semiconductor industry where high purity requirements are prevalent.

Another known alloy, Alloy C, has the following nominal weight percent composition.

|    | Alloy C    |
| -- | ---------- |
| C  | 0.05       |
| Mn | 0.60       |
| Si | 0.40       |
| Cr | 28.00      |
| Ni | 0.50 max.  |

The balance of that alloy is iron and usual impurities. Alloy C is known for its controlled thermal expansion characteristic. Consequently, it has been used substantially exclusively for glass-to-metal seals in electronic vacuum tubes and in incandescent and fluorescent lamps.

SUMMARY OF THE INVENTION

In accordance with one aspect of the present invention, there is provided a corrosion resistant, soft magnetic, ferritic steel alloy having the following broad and preferred compositions in weight percent.

|    | Broad        | Preferred    |
| -- | ------------ | ------------ |
| C  | 0.005–0.040  | 0.008–0.030  |
| Mn | 1.0 max.     | 0.30–0.50    |
| Si | 1.0 max.     | 0.30–0.50    |
| P  | 0.050 max.   | 0.025 max.   |
| S  | 0.020 max.   | 0.004 max.   |
| Cr | 27.0–30.0    | 28.0–29.0    |
| Ni | 0.35 max.    | 0.25 max.    |
| Mo | 0.35 max.    | 0.25 max.    |
| Cu | 0.35 max.    | 0.25 max.    |
| Co | 0.25 max.    | 0.15 max.    |
| N  | 0.010–0.05   | 0.015–0.035  |

The balance of each composition is essentially iron and the usual impurities found in similar grades of ferritic stainless steels. Here and throughout this specification the term "percent" or the symbol "%" means percent by weight unless otherwise indicated.

The foregoing tabulation is provided as a convenient summary and is not intended to restrict the lower and upper values of the ranges of the individual elements of the alloy of this invention for use in combination with each other, or to restrict the ranges of the elements for use solely in combination with each other. Thus, one or more of the element ranges of the broad composition can be used with one or more of the other ranges for the remaining elements in the preferred composition. In addition, a minimum or maximum for an element of the broad composition can be used with the maximum or minimum for that element from the preferred composition.

In accordance with another aspect of this invention, there is provided a magnetic component for a magnetically actuated device. The magnetic component is formed of a corrosion resistant magnetic alloy having the broad and preferred weight percent compositions identified above.

In accordance with a further aspect of this invention, there is provided a solenoid valve that includes a housing having first and second channels formed therein such that said first and second channels meet at an intersection. The first channel has an inlet and an outlet and is adapted for conducting a fluid, such as a gas or liquid. A magnetic coil disposed in the housing such that it substantially surrounds at least a portion of the second channel. A magnetic core is movably disposed in the second channel between the magnetic coil and the intersection of the first and second channels such that when it is displaced within the second channel, a portion of said magnetic core moves into the first channel to close the first channel. The magnetic coil is operatively connected to a source of electric current for energizing the coil.

DETAILED DESCRIPTION

Figure 1:
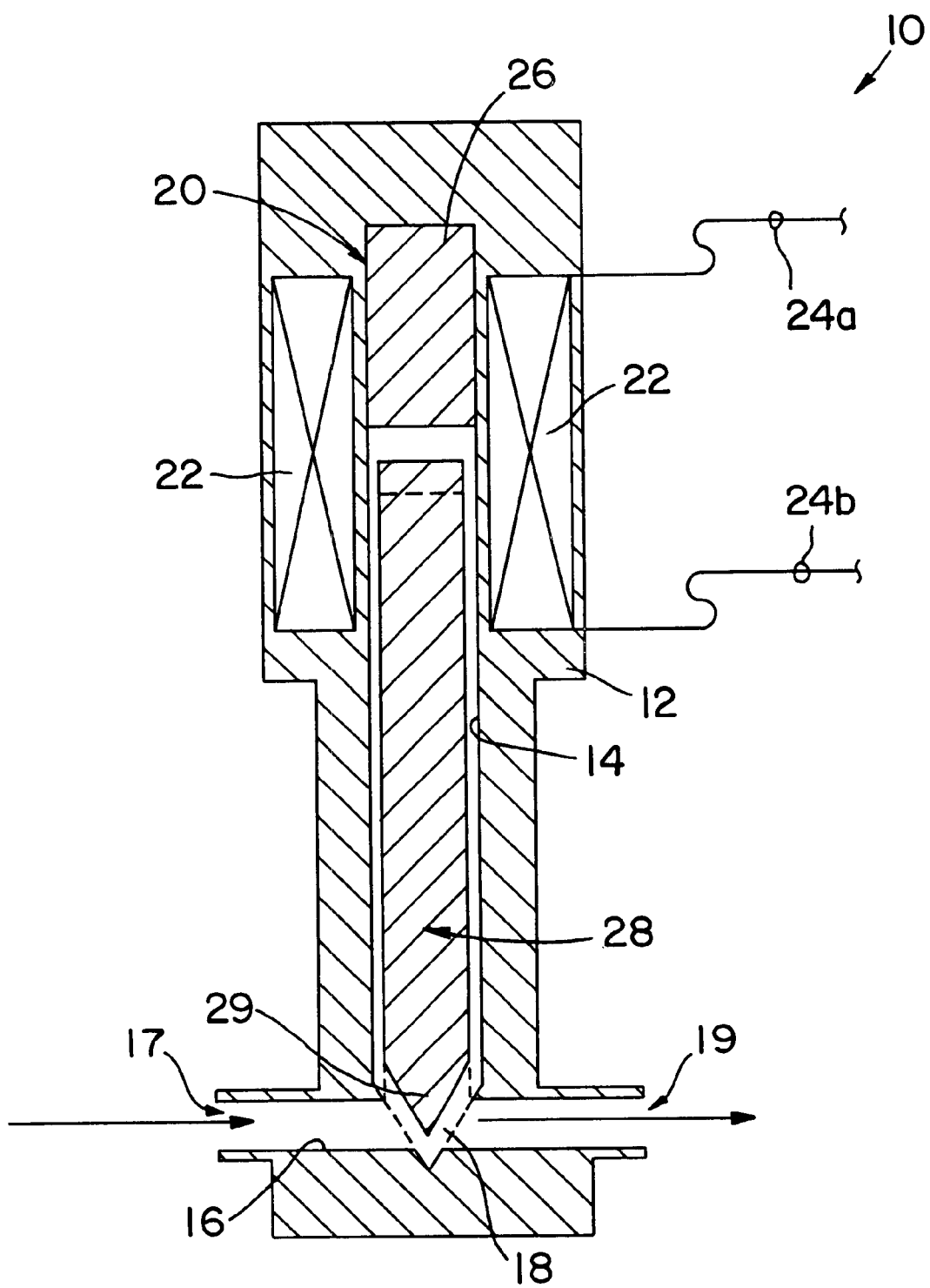
FIG. 1 is a schematic view of a solenoid valve in accordance with the present invention.

The alloy according to the present invention contains at least about 27.0% and preferably at least about 28.0% chromium for enhanced corrosion resistance relative to the known corrosion resistant soft magnetic alloys. Chromium also stabilizes ferrite and thus, helps to prevent the formation of martensite which adversely affects the magnetic properties. Too much chromium adversely affects the magnetic saturation induction property. Therefore, the alloy contains not more than about 30.0% and better yet, not more than about 29.0% chromium.

A small but effective amount of carbon is present in this alloy to benefit the workability of the alloy, especially during forging. To that end, the alloy preferably contains at least about 0.005%, and better yet, at least about 0.008% carbon. Too much carbon adversely affects the magnetic properties of the alloy because excess carbon combines with elements such a chromium to form carbides which limit grain growth when the alloy is heat treated to optimize the magnetic properties. Therefore, the alloy contains not more than about 0.040%, and preferably, not more than about 0.030% carbon.

A small but effective amount of nitrogen is present in this alloy to benefit the workability of this alloy. Preferably the alloy contains at least about 0.010%, and better yet, at least about 0.015% nitrogen. Too much nitrogen adversely affects the magnetic properties provided by the alloy in a manner similar to that described for carbon. Therefore, the alloy contains not more than about 0.05%, and preferably not more than about 0.035% nitrogen.

The alloy according to this invention contains up to about 1.0% manganese and, preferably, the alloy contains at least about 0.30% manganese. to benefit the hot workability of the alloy. Too much manganese leads to the formation of an undesirably high number of inclusions that detract from the surface quality of the alloy after polishing. Therefore, the alloy preferably contains not more than about 0.50% manganese.

Silicon is used to deoxidize the alloy of this invention during melting. Silicon also benefits the resistivity of the alloy. Therefore, the alloy according to this invention contains up to about 1.0% silicon, and preferably, at least about 0.30% silicon. Too much silicon adversely affects the workability and cleanliness of the alloy by combining with other elements to form silicates. Therefore, the alloy preferably contains not more than about 0.50% silicon.

The alloy of this invention may also contain one or more of the elements nickel, molybdenum, copper, and cobalt in amounts that do not adversely affect the magnetic properties, corrosion resistance, or the workability provided by the alloy. In this regard, the alloy may contain up to about 0.35%, preferably not more than about 0.25% of the elements nickel, molybdenum, and/or copper. The alloy may also contain up to about 0.25%, and preferably not more than about 0.15% cobalt.

The balance of the alloy is iron except for the usual impurities. Among such impurities are phosphorus and sulfur. Phosphorus is restricted to not more The alloy according to the present invention is preferably vacuum induction melted. The alloy is preferably hot worked from a temperature of about 1038° C. to make an intermediate form such as flat or round bar. The intermediate form is then annealed and cold finished. Annealing is preferably carried out at about 820° C. for about 1 hour, followed by rapid cooling such as by water quenching. Cold finishing includes such operations as straightening and grinding of the bar forms.

Referring now to FIG. 1, there is shown a solenoid valve in accordance with another aspect of this invention. The solenoid valve 10 includes a body or housing 12 that is formed of a non-magnetic material. The housing 12 has an axial channel 14 and a transverse channel 16 formed therein. Channels 14 and 16 are preferably circular in cross section, but can have other cross-sectional geometries if desired. The axial channel 14 and the transverse channel 16 meet at an intersection 18. The transverse channel 16 has an inlet end 17 and an outlet end 19, each of which is adapted for connection to external piping or tubing (not shown) for conducting a process fluid such as a liquid chemical or a gas.

The axial channel 14 has a head end 20 which is located distal from the intersection 18. A magnetic coil 22 surrounds the head end 20 of axial channel 14. The magnetic coil 22 has electrical leads 24a, 24b which are connected to a source of electric power (not shown) for conducting electrical current to the magnetic coil 22, whereby the magnetic coil can be energized. A stationary magnetic core 26 is disposed in the axial channel 14 at the head end 20 thereof. A moving magnetic core 28 is slidably disposed in the axial channel 14 between the stationary core 26 and the intersection 18. The moving magnetic core 28 is preferably cylindrical in shape, although it may have another cross-sectional geometry if desired. Moving magnetic core 28 has an end distal the stationary core 26 that is adapted for insertion into intersection 18 for closing the transverse channel 16 to control the flow of fluid therethrough. In the embodiment shown, moving magnetic core 28 has a tapered end 29. However, it is contemplated that the end 29 can have other shapes if desired. A biasing spring (not shown) is used to bias the moving core 28 into either a normally-open position (as shown) or a normally closed position (shown in phantom). channel 16 to control the flow of fluid therethrough. In the embodiment shown, moving magnetic core 18 has a tapered end 29. However, it is contemplated that the end 29 can have other shapes if desired. A biasing spring (not shown) is used to bias the moving core 28 into either a normally-open position (as shown) or a normally closed position (shown in phantom).

The stationary magnetic core 26 and the moving magnetic core 28 are formed of a soft magnetic steel alloy. Preferably, the moving magnetic core 28 is formed from the corrosion resistant, soft magnetic, ferritic steel alloy described above. The corrosion resistance is needed because the moving magnetic core 28 will come into contact with liquids and gases that are corrosive to metal. The corrosion resistant, soft magnetic, ferritic steel alloy described herein is highly suitable for use in a solenoid valve because it provides a unique combination of magnetic properties and enhanced corrosion resistance. More specifically, the alloy has been shown to provide a coercive force ($H_c$) of about 1.26 Oersteds (Oe), a saturation magnetic induction ($B_{sat}$) of greater than about 13.2 kilogauss, a maximum permeability ($\mu$) of about 1624, and a residual magnetic induction ($B_r$) of about 5.20 kilogauss. Those values compare very favorably with the corresponding magnetic properties of Alloys A and B described above. Moreover, the alloy used in the solenoid valve according to this invention has excellent corrosion resistance in a variety of typically corrosive media. In particular, it has been demonstrated that the alloy according to the present invention has significantly better resistance to pitting corrosion than either Alloy A or Alloy B described above.

An embodiment of the present invention has been described in connection with a magnetic core and a solenoid valve incorporating such a core. However, it is contemplated that the alloy according to this invention can also be used as a magnetic component in any type of magnetically actuated device, such as, for example, a magnetic relay, that is intended for service in a corrosive environment.

The terms and expressions which have been employed herein are used as terms of description, not of limitation. There is no intention in the use of such terms and expressions of excluding any equivalents of the features shown and described or portions thereof. However, it is recognized that various modifications are possible within the scope of the invention claimed.

What is claimed is:

1. A corrosion resistant soft magnetic ferritic steel alloy consisting essentially of, in weight percent, about:

| | |
|---|---|
| C | 0.005–0.040 |
| Mn | 1.0 max. |
| Si | 1.0 max. |
| P | 0.050 max. |
| S | 0.020 max. |
| Cr | 27.0–30.0 |
| Ni | 0.35 max |
| Mo | 0.35 max. |
| Cu | 0.35 max. |
| Co | 0.25 max. |
| N | 0.010–0.05 | and the balance essentially iron and the usual impurities.

2. A corrosion resistant, soft magnetic ferritic steel alloy as set forth in claim 1 which contains at least about 0.30% manganese.

3. A corrosion resistant, soft magnetic ferritic steel alloy as set forth in claim 1 which contains at least about 0.30% silicon.

4. A corrosion resistant, soft magnetic ferritic steel alloy as set forth in claim 1 which contains at least about 0.008% carbon.

5. A corrosion resistant, soft magnetic ferritic steel alloy as set forth in claim 1 or 4 which contains not more than about 0.030% carbon.

6. A corrosion resistant, soft magnetic ferritic steel alloy as set forth in claim 1 which contains at least about 0.015% nitrogen.

7. A corrosion resistant, soft magnetic ferritic steel alloy as set forth in claim 1 or 6 which contains not more than about 0.035% nitrogen.

8. A corrosion resistant soft magnetic ferritic steel alloy consisting essentially of, in weight percent, about:

| | |
|---|---|
| C | 0.008–0.030 |
| Mn | 0.30–0.50 |
| Si | 0.30–0.50 |
| P | 0.025 max. |
| S | 0.004 max. |
| Cr | 28.25–29.00 |
| Ni | 0.35 max |
| Mo | 0.35 max. |
| Cu | 0.35 max. |
| Co | 0.25 max. |
| N | 0.015–0.035 | and the balance essentially iron and the usual impurities.

9. A corrosion resistant, soft magnetic ferritic steel alloy as set forth in claim 8 which contains not more than about 0.25% each of nickel, molybdenum, and copper.

10. A corrosion resistant, soft magnetic ferritic steel alloy as set forth in claim 8 or 9 which contains not more than about 0.15% cobalt.

11. A magnetic component for a magnetically actuated device, said magnetic component being formed of a corrosion resistant, soft magnetic ferritic steel alloy consisting essentially of, in weight percent, about

| | |
|---|---|
| C | 0.005–0.040 |
| Mn | 1.0 max. |
| Si | 1.0 max. |
| P | 0.050 max. |
| S | 0.020 max. |
| Cr | 27.0–30.0 |
| Ni | 0.35 max |
| Mo | 0.35 max. |
| Cu | 0.35 max. |
| Co | 0.25 max. |
| N | 0.010–0.05 | and the balance being essentially iron and the usual impurities.

12. A magnetic component as set forth in claim 11 wherein the alloy contains at least about 0.30% manganese.

13. A magnetic component as set forth in claim 11 wherein the alloy contains at least about 0.30% silicon.

14. A magnetic component as set forth in claim 11 wherein the alloy contains at least about 0.008% carbon.

15. A magnetic component as set forth in claim 11 or 14 wherein the alloy contains not more than about 0.030% carbon.

16. A magnetic component as set forth in claim 11 wherein the alloy contains at least about 0.015% nitrogen.

17. A magnetic component as set forth in claim 11 or 16 wherein the alloy contains not more than about 0.035% nitrogen.

18. A magnetic component for a magnetically actuated device, said magnetic component being formed of a corrosion resistant, soft magnetic ferritic steel alloy consisting essentially of, in weight percent, about:

| | |
|---|---|
| C | 0.008–0.030 |
| Mn | 0.30–0.50 |
| Si | 0.30–0.50 |
| P | 0.025 max. |

-continued

| | |
|---|---|
| S | 0.004 max. |
| Cr | 28.25–29.00 |
| Ni | 0.35 max |
| Mo | 0.35 max. |
| Cu | 0.35 max. |
| Co | 0.25 max. |
| N | 0.015–0.035 | and the balance essentially iron and the usual impurities.

19. A magnetic component as set forth in claim 18 wherein the alloy contains not more than about 0.25% each of nickel, molybdenum, and copper.

20. A magnetic component as set forth in claim 18 wherein the alloy contains not more than about 0.15% cobalt.

21. A solenoid valve comprising:
 a housing having first and second channels formed therein such that said first and second channels meet at an intersection;
 said first channel having an inlet and an outlet and being adapted for conducting a fluid;
 a magnetic coil disposed in said housing such that it substantially surrounds a portion of said second channel;
 a magnetic core disposed in said second channel adjacent to said magnetic coil and having an end adapted to fit in the intersection of said first and second channels, said core being formed of a corrosion resistant, soft magnetic ferritic steel alloy consisting of, in weight percent, about

| | |
|---|---|
| C | 0.005–0.040 |
| Mn | 1.0 max. |
| Si | 1.0 max. |
| P | 0.050 max. |
| S | 0.020 max. |
| Cr | 27.0–30.0 |
| Ni | 0.35 max |
| Mo | 0.35 max. |
| Cu | 0.35 max. |
| Co | 0.25 max. |
| N | 0.010–0.05 | and the balance essentially iron and the usual impurities; and means for conducting electrical current to said magnetic coil.

* * * * *